June 20, 1967   D. NICITA ETAL   3,325,863
APPARATUS FOR MELT-SPINNING
Filed Sept. 22, 1964
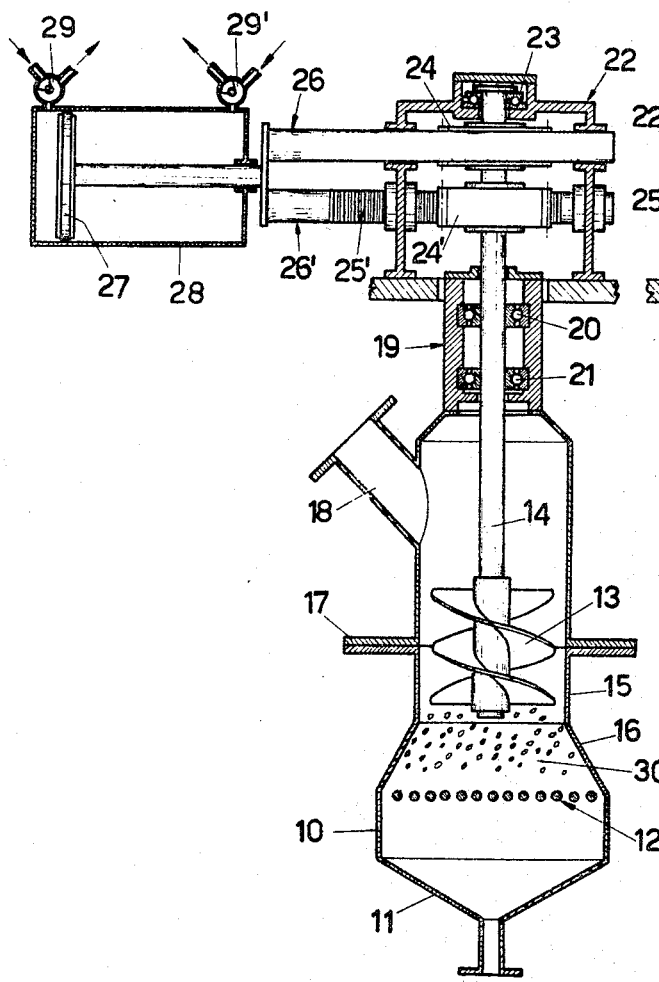
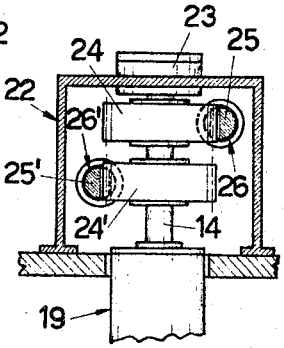
INVENTORS
Domenico Nicita and
BY Paolo Parmeggiani
Attorney

United States Patent Office 3,325,863
Patented June 20, 1967

3,325,863
APPARATUS FOR MELT-SPINNING
Domenico Nicita, Cesano Maderno, and Paolo Parmeggiani, Seveso, Italy, assignors to SNIA Viscosa Società Nationale Industria Applicazioni Viscosa S.p.A., Milan, Italy, a company of Italy
Filed Sept. 22, 1964, Ser. No. 398,269
Claims priority, application Italy, Sept. 30, 1963, Patent 705,908
2 Claims. (Cl. 18—8)

The present invention relates to a device for the melt-spinning of synthetic linear polymers, such as polyamides, polyesters and the like.

As is known, said melt-spinning can be carried out by feeding the solid polymer in the shape of granular particles to a melter member equipped with openings that permit the passage of the molten polymer, which is then conveyed to the spinnerets.

The melter member may have different structures, such as for instance the structure of a flat grid; and that structure is illustrated in the present application, for the sake of simplicity, without intending thereby to limit in anyway the scope of the invention.

It has been known for a long time to combine a screw-feeder with the melter member in a melt-spinning head.

As is known, a screw-feeder is not able to ensure an absolute constancy of delivery, but only an approximate constancy and an approximate uniformity of pressure. However, the requirements of melt-spinning are extremely delicate and, therefore, adjusting and control members become necessary which realize the following objects: they should ensure the constancy of the liquid polymer delivered and, therefore, the constancy of count; they should always ensure an adequate feed of solid polymer to the melter member; they should allow the melter member to attain maximal functional effectiveness, namely to produce the maximal amount of molten polymer in a unit of time; they should avoid damage to the spinning head in case feed of the polymer fed in the solid state is resisted by the formation of bridges or for other reasons.

It is known from British Patent No. 744,855 that the pressure of the feeding screw in a spinning head can be made constant by assembling the screw in a slidable manner in a cylinder so that it can rise by effect of the resistance of the compressed polymer thereby overcoming the counterpressure of a spring or of a pneumatic piston, so as to keep approximately constant the load exerted by the screw upon the particles of polymer. In such case however it is necessary to allow the feeding screw possibility of axial movement, whence the screw reciprocates axially while it turns continuously being immersed in a mass of granular polymer, with possibility of blocking and of other inconveniences.

It is an object of the present invention to provide an improved feeding process for feeding by a screw the flakes of polymer and employing a melter body having for instance the structure of a grid and a device for embodying the process, which permit feeding at strictly constant pressure.

According to the invention, the pressure exerted by the feeding screw upon the mass of polymer in flakes is kept constant by applying to said screw a constant couple. Said constant couple is preferably obtained by means of a constant force, produced by a controllable pneumatic or hydraulic source of pressure, acting upon the shaft of the screw with constant leverage, by means of suitable transmission members, but it can also be obtained directly from a motor or engine with constant torque or equipped with a joint with constant torque.

The use of a controllable source of pressure (pneumatic or hydraulic) is particularly advantageous since it permits varying the magnitude of the constant torque and, consequently, of the pressure exerted by the feeding screw upon the polymer, according to the needs of the spinning process, with extreme simplicity and precision.

It has been found that by means of the use of a constant couple, which is translated into a constant pressure exerted by the feeding screw upon the polymer, the process and apparatus equipment can be adjusted depending on the delivery of molten polymer desired, without needing any members for automatic regulation, as required according to previous proposals, which may originate inconveniences and at any rate represent complications in points of sensitivity of the apparatus.

It has been found unexpectedly that the constancy of pressure as exerted by the screw obtained in strict manner according to the invention is translated without any other controls or interventions into a constant delivery of the extruded polymer and, therefore, an absolute regularity of count of the polymer.

The invention will be more fully understood by an example of embodiment thereof, with reference to FIGURES 1 and 2 of the accompanying drawing.

In the figures, 10 indicates generically the melting head having a collecting pit 11 and a melting body diagrammatically indicated as a grid 12. The feeding screw 13 is assembled on a vertical shaft 14 arranged centrally with respect to the spinning head, immediately above the grid 12. Said screw works in a preferably cylindrical shell 15. In FIGURE 1, the portion of shell above the screw 13 too is cylindrical, although it may be of another shape, for instance frusto-conical, while below the screw, the shell of the melting head has a diverging frusto-conical portion 16 which too might be modified but which has been found to be favourable to avoid formation of bridges. In any case the shell 15 passes through the flange 17 forming part of the framework of the device, not represented. The polymer is fed into mouth 18 inclined towards the shell 15.

Above the screw 13 the control shaft 14 is sustained in a convenient support 19 equipped with suitable bearings indicated by 20 and 21. The control devices of the shaft 14 of the screw are sustained by a framework generically indicated by 22, placed at the top of the shaft; said framework carries the end support 23 for the shaft of the screw. On the shaft of the screw there is fitted at least one toothed wheel, and preferably there are fitted two toothed wheels 24 and 24' as indicated in FIGURE 1. The toothed wheel or each one of the toothed wheels if these are in number of more than one, meshes with a rack, respectively 25 and 25' as indicated in FIG. 2. Each rack is carried by a rod, respectively 26 and 26', connected to the piston 27, diagrammatically indicated in FIGURE 1, which works in a cylinder 28. The connection is through a disc and the piston rod which is secured to the piston. Into opposite ends of the cylinder 28 there is introduced alternately compressed air by two valves 29 and 29', which too are diagrammatically indicated in the drawing. Depending on the pressure to be obtained upon the mass of polymer in flakes, indicated by 30 in FIGURE 1, one feeds compressed air or another fluid with the required pressure into the cylinder 28. Supposing that the piston 27 is in the position indicated in FIGURE 1, the compressed air will pass through the valve 29, while the valve 29' is open for free discharge. If the operating pressure has not yet been attained in correspondence with the mass of polymer in flakes, the piston 27 is pushed towards the right and the rod 26 pushes the racks 25, 25' which rotate the toothed wheels 24, 24. Both of the wheels are mounted on the shaft 14 with a free-wheel device in such a way that the shaft 14 always turns in the forwarding direction of the screw 13, namely in this case in clockwise direction if seen from top. At the time illustrated in FIG. 1, therefore, the wheel 24' will cause the rotation of the shaft while the wheel 24 turns loosely. The torque transmitted by the wheel 24' to the shaft 14 is constant and depends on the pitch of the screw 13 which becomes a constant pressure upon the mass of the polymer 30. When the operating pressure has been attained in said mass, it balances the pressure of the fluid in the cylinder 28 and the movement of the feeding device stops, to be resumed again when the pressure of the polymer mass descends below the operating pressure.

When the piston 27 has arrived at the end of stroke towards the right, the valve 29 opens for discharge and the fluid under pressure is conveyed away by valve 29'. Then the piston 27 performs its return stroke and in that stroke the toothed wheel 24' turns loosely while the wheel 24 controls the shaft 14 to turn always in the same direction (clockwise if looked at from above) and with the same couple, until the piston 27 reaches its end of stroke towards the left, whereafter the cycle recommences. The movement so described has no kinematic dead points and, therefore, is preferable to the one that could be obtained with a crank-system of rotary thrust.

Instead of having a source of constant pressure one might have a source of constant torque which is constituted by a motor or engine with constant torque directly fitted onto the shaft of the feeding screw. Said motor may be a penumatic motor or an electric motor as well.

We claim:

1. In apparatus for melting a particulate synthetic linear polymer comprising an enclosure having an upper, a middle, and a lower portion, an inlet passage in said upper portion for the particulate polymer, melting grid means in said lower portion, and a polymer compactor feed-screw rotatably mounted in said middle portion for forcedly feeding the particulate polymer toward said grid means, a shaft to which said feed-screw is secured, and means for rotating said shaft to effect rotation of said feed screw, the improvement wherein said rotating means comprises circular gear means connected to said shaft, rack means supported for rectilinear movement in mesh with said gear means, a piston reciprocable by fluid pressure in a cylinder and connected to said rack means to effect rectilinear movement of said rack means, whereby upon application of a given constant fluid pressure to said piston a given torque is applied to said feed screw for feeding the polymer to said grid means under constant pressure irrespective of the speed of rotation of said screw.

2. Apparatus as claimed in claim 1, wherein said circular gear means includes two coaxial circular gears connected to said shaft so that upon rotation of one of said gears in one direction and upon rotation of the other gear in the opposite direction said shaft rotates always in the same direction, and said rack means includes first and second racks, both of which are secured to said piston and which mesh, respectively, with said two gears in diametrically opposite locations as respects the axis of said shaft, whereby said piston on its stroke in one direction drives one of said circular gears in one direction through one of said racks and said piston on its stroke in the opposite direction drives the other of said circular gears in the opposite direction, and wherein valve means is provided for supplying fluid under constant pressure alternately to opposite ends of said cylinder to effect reciprocation of said piston therein.

References Cited
UNITED STATES PATENTS 3,010,147 11/1961 Davies et al. _____ 264—176 X
3,193,601 7/1965 Billingsley _____ 264—176 X

FOREIGN PATENTS 178,604 1962 Sweden.

ALEXANDER H. BRODMERKEL, *Primary Examiner.*

J. H. WOO, *Assistant Examiner.*